US012611623B2

(12) United States Patent
Suzuki et al.

(10) Patent No.: US 12,611,623 B2
(45) Date of Patent: Apr. 28, 2026

(54) GAS-LIQUID SEPARATOR

(71) Applicant: USUI CO., LTD., Shizuoka (JP)

(72) Inventors: Tetsunobu Suzuki, Shizuoka (JP);
Masaru Suzuki, Shizuoka (JP)

(73) Assignee: USUI CO., LTD., Shizuoka (JP)

( * ) Notice: Subject to any disclaimer, the term of this
patent is extended or adjusted under 35
U.S.C. 154(b) by 348 days.

(21) Appl. No.: 18/268,019

(22) PCT Filed: Dec. 27, 2021

(86) PCT No.: PCT/JP2021/048584
§ 371 (c)(1),
(2) Date: Jun. 16, 2023

(87) PCT Pub. No.: WO2022/145423
PCT Pub. Date: Jul. 7, 2022

(65) Prior Publication Data
US 2024/0050882 A1 Feb. 15, 2024

(30) Foreign Application Priority Data
Dec. 28, 2020 (JP) ................................. 2020-219258

(51) Int. Cl.
*B01D 45/16* (2006.01)
*F02M 26/35* (2016.01)

(52) U.S. Cl.
CPC .......... *B01D 45/16* (2013.01); *B01D 2257/80*
(2013.01); *F02M 26/35* (2016.02)

(58) Field of Classification Search
CPC .... B01D 45/16; B01D 2257/80; B01D 45/12;
F02M 26/35; F02M 35/10222; F02M
35/10262; B04C 2003/006; B04C 3/06
See application file for complete search history.

(56) References Cited

U.S. PATENT DOCUMENTS 2,628,894 A * 2/1953 Langmyhr ......... B01D 11/0484
422/209
3,271,929 A * 9/1966 Bowden ................ E21B 21/063
210/512.1
(Continued)

FOREIGN PATENT DOCUMENTS

CN 110180220 A 8/2019
JP S552458 U 1/1980
(Continued)

OTHER PUBLICATIONS

Chinese Office Action from corresponding Application No.
202180084281.1 mailed on Jun. 27, 2025, 14 pages with translation.
(Continued)

*Primary Examiner* — Dung H Bui
(74) *Attorney, Agent, or Firm* — Tucker Ellis LLP

(57) ABSTRACT

A gas-liquid separator comprises a pipe member through
which a gas-liquid two-phase fluid flows, the gas-liquid
two-phase fluid comprising gas and liquid, and a swirling
flow generator within the pipe member, the swirling flow
generator being configured to swirl the gas-liquid two-phase
fluid to separate the gas and the liquid therefrom. The
swirling flow generator comprises blades that extend spirally
about a central axis of the pipe member. Each of the blades
comprises a distal end in a pipe radial direction of the pipe
member. The distal ends are continuous over an entire
circumference of the pipe member when the pipe member is
viewed from an axial direction thereof. A communication
portion is provided between the pipe member and the
swirling flow generator. The communication portion is con-
figured to communicate a first space upstream of the swirl-
ing flow generator with a second space downstream of the
swirling flow generator.

2 Claims, 10 Drawing Sheets

(56) References Cited

U.S. PATENT DOCUMENTS

| | | | | |
|---|---|---|---|---|
| 3,517,821 A * | 6/1970 | Keller | ..................... | B04C 3/06 |
| | | | | 210/512.1 |
| 3,713,279 A * | 1/1973 | Moore | .................. | B01D 45/16 |
| | | | | 55/319 |
| 3,759,324 A * | 9/1973 | Mecusker | ................. | B04C 9/00 |
| | | | | 166/267 |
| 4,187,089 A * | 2/1980 | Hodgson | ............... | B01D 45/18 |
| | | | | 55/463 |
| 4,376,676 A * | 3/1983 | Gill | .................. | B01D 17/0217 |
| | | | | 96/216 |
| 4,424,068 A * | 1/1984 | McMillan | ............... | E21B 43/34 |
| | | | | 96/183 |
| 4,588,423 A * | 5/1986 | Gillingham | ............... | B03C 3/15 |
| | | | | 60/275 |
| 4,834,887 A | 5/1989 | Broughton | | |
| 4,971,603 A * | 11/1990 | Prinsloo | ................... | B04C 3/06 |
| | | | | 55/345 |
| 4,976,748 A * | 12/1990 | Prinsloo | ................... | B04C 3/00 |
| | | | | 95/269 |
| 5,743,926 A | 4/1998 | Bannon et al. | | |
| 6,234,621 B1 * | 5/2001 | Musser | ................... | B41J 2/175 |
| | | | | 347/92 |
| 6,752,845 B2 * | 6/2004 | Haland | .................... | B04C 3/06 |
| | | | | 55/433 |
| 8,425,641 B2 * | 4/2013 | Chaudhari | ............. | B01D 50/20 |
| | | | | 55/346 |
| 9,266,042 B2 | 2/2016 | Kvamsdal et al. | | |
| 11,117,143 B2 * | 9/2021 | Son | ........................... | B04C 3/00 |
| 11,179,662 B2 * | 11/2021 | Suzuki | ..................... | B04C 3/06 |
| 11,458,428 B2 * | 10/2022 | Wyatt | ............... | B01D 46/2403 |

| | | | | |
|---|---|---|---|---|
| 2002/0189995 A1 * | 12/2002 | Bruckmann | ........... | B01D 45/12 |
| | | | | 210/512.3 |
| 2005/0252837 A1 * | 11/2005 | Haland | .................. | B01D 45/12 |
| | | | | 210/194 |
| 2015/0290560 A1 * | 10/2015 | Høydal | ............. | B01D 19/0042 |
| | | | | 95/243 |
| 2016/0096129 A1 * | 4/2016 | Kochubei | ............. | F01M 13/04 |
| | | | | 55/447 |
| 2018/0250620 A1 * | 9/2018 | Vingelven | ............. | B01D 45/08 |
| 2018/0361290 A1 | 12/2018 | Suzuki et al. | | |
| 2018/0369731 A1 * | 12/2018 | Mueller | ................. | B01D 45/16 |
| 2019/0168147 A1 * | 6/2019 | Bratton | ................. | B01D 45/12 |
| 2020/0277919 A1 * | 9/2020 | Suzuki | ................. | F02M 26/19 |
| 2020/0353394 A1 * | 11/2020 | Chen | ..................... | B01D 45/14 |
| 2024/0050882 A1 * | 2/2024 | Suzuki | .................. | B01D 45/16 |

FOREIGN PATENT DOCUMENTS

| | | |
|---|---|---|
| JP | 2005000864 A | 1/2005 |
| JP | 2010104906 A | 5/2010 |
| JP | 2010115627 A | 5/2010 |
| JP | 2011161427 A | 8/2011 |
| WO | 2020174660 A1 | 9/2020 |

OTHER PUBLICATIONS

International Search Report from corresponding International Application No. PCT/JP2021/048584, dated Mar. 8, 2022, 5 pages with translation.
Extended European Search Report from corresponding Application No. 21915282.4 mailed on Oct. 7, 2024, 8 pages.

* cited by examiner

GAS-LIQUID SEPARATOR

CROSS-REFERENCE TO RELATED APPLICATION

The present application is based upon and claims the benefit of priority from Japanese Patent Application No. 2020-219258 filed with the Japan Patent Office on Dec. 28, 2020, the entire disclosure of which is entirely incorporated herein by reference.

TECHNICAL FIELD

The present disclosure relates to a gas-liquid separator that separates gas and liquid in a gas-liquid two-phase fluid.

BACKGROUND ART

In the prior art, a gas-liquid separator that swirls a gas-liquid two-phase fluid flowing through a pipe member by a swirling flow generator and separates the gas-liquid two-phase fluid into gas and liquid (see Patent Literature 1: JP 2010-104906 A, for example) is known.

SUMMARY

In a conventional gas-liquid separator, the swirling flow generator includes blades extending spirally from the central axis of the pipe member. The distal ends of the blades in the pipe radial direction are continuous around the entire circumference of the pipe member when the pipe member is viewed from the axial direction thereof. Accordingly, there is no gap extending in the axial direction between adjacent blades. In addition, each of the blades contacts the inner circumferential surface of the pipe member along the entire length of the blade. When the gas-liquid two-phase fluid is at a low flow rate, the liquid does not become fine particles but naturally separates from the gas before swirling to become water droplets attached to the inner circumferential surface of the pipe member. The liquid in the form of water droplets flows along the pipe axial direction within the pipe member by the flow of gas. However, the flow is obstructed by the blades of the swirling flow generator because the blades are in contact with the inner circumferential surface of the pipe member. For this reason, it is necessary to provide a drain pipe at a position upstream of the swirling flow generator in the flow direction of the gas-liquid two-phase fluid to guide the water droplets to a water storage tank before the water droplets flow into a region where the swirling flow generator is located.

However, in the case where the drain pipe is provided and/or the drain pipe is connected to the water storage tank, such configuration deteriorates the degree of freedom to arrange various members of the gas-liquid separator and hinders cost reduction as the gas-liquid separator.

The present disclosure has been made in view of the above issues, and an object of the present disclosure is to provide a gas-liquid separator capable of collecting liquid at a position downstream of a swirling flow generator regardless of a flow rate of a gas-liquid two-phase fluid.

In order to achieve the above object, a gas-liquid separator of the present disclosure includes a pipe member through which a gas-liquid two-phase fluid flows, the gas-liquid two-phase fluid including gas and liquid; and a swirling flow generator within the pipe member, the swirling flow generator being configured to swirl the gas-liquid two-phase fluid to separate the gas and the liquid therefrom. The swirling flow generator includes blades that extend spirally about a central axis of the pipe member. Each of the blades includes a distal end in a pipe radial direction of the pipe member. The distal ends are continuous over an entire circumference of the pipe member when the pipe member is viewed from an axial direction thereof. A communication portion is provided between the pipe member and the swirling flow generator. The communication portion is configured to communicate a first space upstream of the swirling flow generator with a second space downstream of the swirling flow generator.

DETAILED DESCRIPTION

Figure 1:
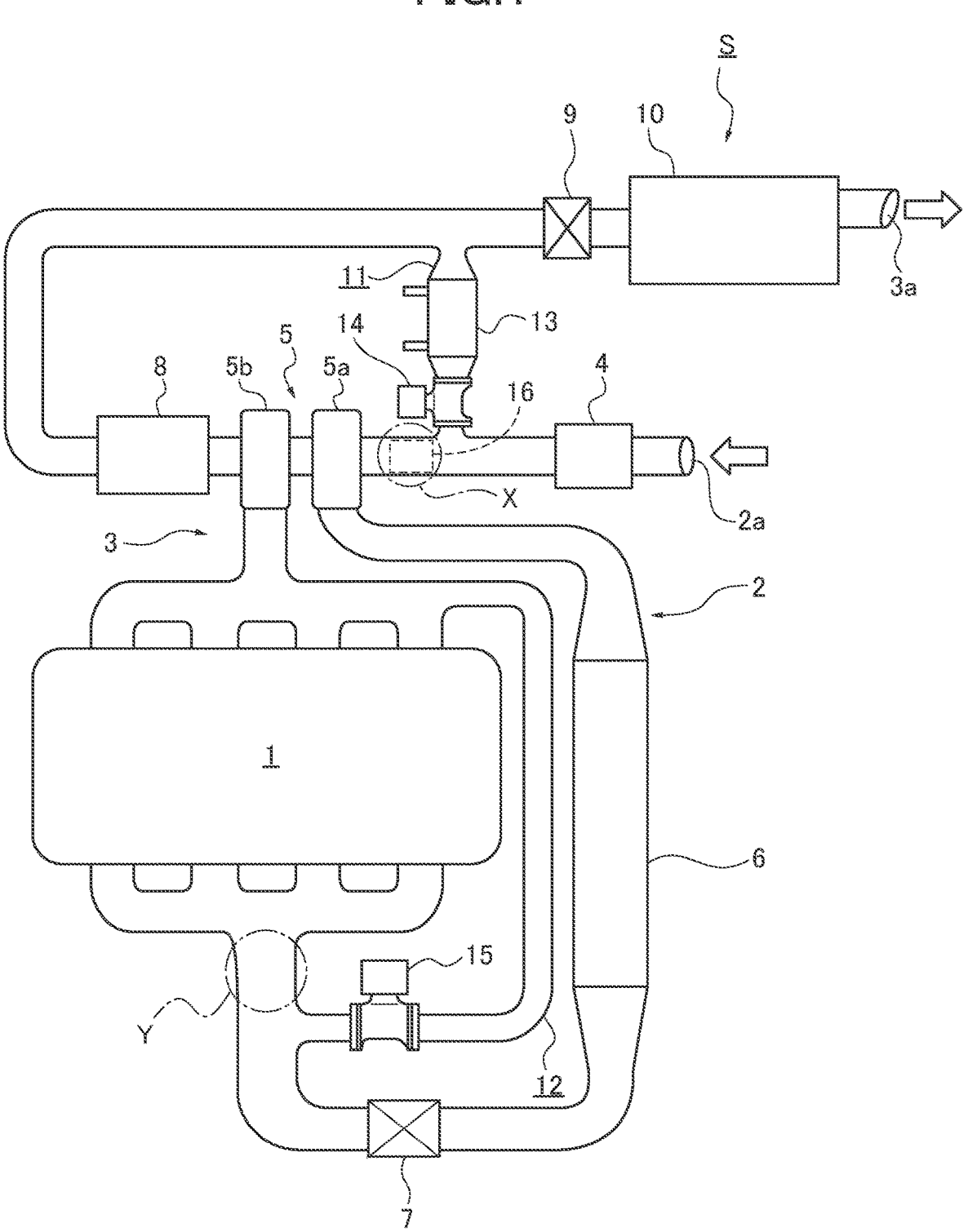
FIG. 1 is an overall system diagram illustrating an exhaust gas recirculation system of an internal combustion engine to which a gas-liquid separator of a first embodiment is applied.

Hereinafter, an embodiment of a gas-liquid separator of the present disclosure is described based on a first embodiment illustrated in the drawings.

(First Embodiment) First, a configuration of the gas-liquid separator in the first embodiment is described separately with headings "Entire System Configuration of Application Example", "Detailed Configuration of Gas-liquid Separator", and "Detailed Configuration of Swirling Flow Generator".

(Entire System Configuration of Application Example) FIG. 1 is an overall system diagram illustrating an exhaust gas recirculation system S of an internal combustion engine 1 to which a gas-liquid separator 16 of the first embodiment is applied. The gas-liquid separator 16 of the first embodiment is applied to the exhaust gas recirculation system S of the internal combustion engine 1 illustrated in FIG. 1. Here, the internal combustion engine 1 illustrated in FIG. 1 is a diesel engine mounted on a vehicle as a driving source for traveling and includes four cylinders (not illustrated). An intake passage 2 and an exhaust passage 3 are connected to each cylinder.

An intake passage 2 includes an intake port 2a at an end thereof. The intake passage 2 is provided with an air cleaner 4 for filtering intake gas, a compressor 5a of a turbocharger 5, an intercooler 6 for cooling intake gas, and a throttle valve 7 for adjusting the amount of the intake gas in this order from the intake port 2a side. The exhaust passage 3 is provided with a turbine 5b of the turbocharger 5, an exhaust purification catalyst 8 for purifying exhaust gas, and an exhaust throttle valve 9 for adjusting the flow rate of the exhaust gas in this order from the internal combustion engine 1 side. Note that a muffler 10 is provided downstream of the exhaust throttle valve 9, and an exhaust port 3a is formed downstream of the muffler 10.

The intake passage 2 and the exhaust passage 3 are connected by a low-pressure EGR passage 11 and a high-pressure EGR passage 12.

The "EGR" is an abbreviation of "exhaust gas recirculation" which is a technique of taking out a portion of the exhaust gas after combustion in the internal combustion engine 1 and taking in the exhaust gas again and is also referred to as exhaust gas recirculation.

The low-pressure EGR passage 11 connects the intake passage 2 upstream of the compressor 5a and the exhaust passage 3 downstream of the exhaust purification catalyst 8. On the other hand, the high-pressure EGR passage 12 connects the intake passage 2 downstream of the compressor 5a and the exhaust passage 3 upstream of the turbine 5b. Thereby, in the low-pressure EGR passage 11, the exhaust gas that passes through the turbine 5b returns to the intake side of the compressor 5a. In the high-pressure EGR passage 12, the exhaust gas before flowing into the turbine 5b returns to the intake side that passes through the compressor 5a.

The low-pressure EGR passage 11 is provided with an EGR cooler 13 and a low-pressure EGR valve 14. The EGR cooler 13 is configured to cool the exhaust gas guided to the intake passage 2. The low-pressure EGR valve 14 is configured to adjust the flow rate of the exhaust gas recirculated to the intake passage 2 via the low-pressure EGR passage 11. The high-pressure EGR passage 12 is provided with a high-pressure EGR valve 15. The high-pressure EGR valve 15 is configured to adjust the flow rate of the exhaust gas recirculated to the intake passage 2 via the high-pressure EGR passage 12.

In the low-pressure EGR passage 11, the exhaust gas can be recirculated without reducing the turbine passage exhaust amount of the turbocharger 5, and the NOx reduction effect is large. However, it is concerned that condensed water may be generated by cooling the EGR gas in the EGR cooler 13 or by mixing the EGR gas with the air during cold weather. Therefore, in the exhaust gas recirculation system S of the first embodiment, the gas-liquid separator 16 is provided at a position downstream of the low-pressure EGR valve 14 and upstream of the compressor 5a of the turbocharger 5 (a position surrounded by an alternate long and short dash line X shown in FIG. 1) to collect and discharge the condensed water by the gas-liquid separator 16.

Figure 2:
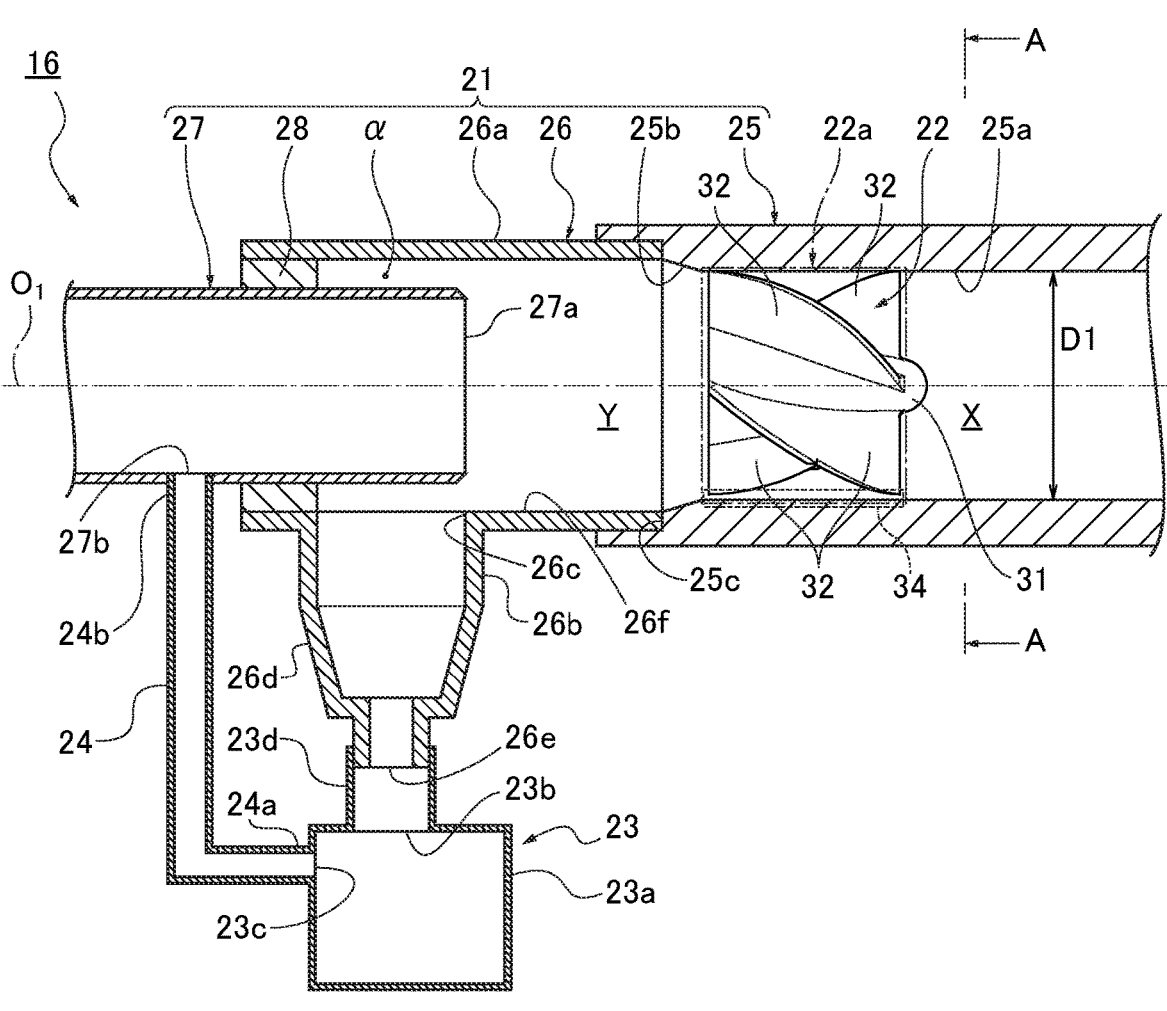
FIG. 2 is a cross-sectional view illustrating the gas-liquid separator of the first embodiment.

(Detailed Configuration of Gas-liquid Separator) FIG. 2 is a cross-sectional view illustrating the gas-liquid separator 16 of the first embodiment. The gas-liquid separator 16 of the first embodiment includes a pipe member 21, a swirling flow generator 22, a water storage tank 23, and a bypass pipe 24.

The pipe member 21 has a first end that communicates with the intake port 2a and the low-pressure EGR valve 14 and a second end that communicates with the compressor 5a of the turbocharger 5 and exhaust gas in a state where gas and particulate liquid (condensed water) are mixed (hereinafter, referred to as "gas-liquid two-phase fluid") flows. Further, the pipe member 21 is disposed such that a central axis $O_1$ is arranged along the horizontal direction when mounted on the vehicle. The pipe member 21 is formed by connecting three pipes, namely, a first pipe 25, a second pipe 26, and a third pipe 27. The first pipe 25, the second pipe 26, and the third pipe 27 are sequentially connected from the upstream side in the flow direction of the gas-liquid two-phase fluid (the right side in FIG. 2, hereinafter referred to as a "fluid entering side") toward the downstream side in the flow direction of the gas-liquid two-phase fluid (the left side in FIG. 2, hereinafter referred to as a "fluid exiting side").

In the following description, the axial direction of the pipe member 21 (direction along the central axis $O_1$) is referred to as a "pipe axial direction", and the radial direction of the pipe member 21 (direction orthogonal to the central axis $O_1$) is referred to as a "pipe radial direction". Further, the circumferential direction of the pipe member 21 (the circumferential direction about the central axis $O_1$) is referred to as a "pipe circumferential direction".

The first pipe 25 is a straight pipe member in which the swirling flow generator 22 is provided. The first pipe 25 includes a swirling region 22a, a tapered region 25b, and a stepped portion 25c therewithin. The swirling region 22a is a region in which the swirling flow generator 22 is disposed. The tapered region 25b is a region in which the inner diameter dimension of the first pipe 25 gradually increases toward the fluid exiting side. The stepped portion 25c is a portion on which the second pipe 26 abuts. Here, the tapered region 25b is formed on the fluid exiting side of the swirling region 22a. The stepped portion 25c is formed on the fluid exiting side of the tapered region 25b. The inner diameter dimension of the first pipe 25 increases in the order of the swirling region 22a, the tapered region 25b, and the stepped portion 25c.

The second pipe 26 is a T-shaped pipe member including a horizontal portion 26a and a vertical portion 26b. The horizontal portion 26a is connected to the first pipe 25. The vertical portion 26b is connected to the horizontal portion 26a in an orthogonal state.

The horizontal portion 26a includes a first end that is inserted into the first pipe 25. The first end of the horizontal portion 26a is in contact with an inner circumferential surface 25a of the first pipe 25 when inserted into the first pipe 25. Also, the first end of the horizontal portion 26a abuts the stepped portion 25c. The axial direction of the horizontal portion 26a coincides with the central axis $O_1$ of the pipe member 21 and extends in the horizontal direction.

A drain opening 26c is formed at a connection portion between the horizontal portion 26a and the vertical portion 26b. The horizontal portion 26a and the vertical portion 26b communicate with each other. The drain opening 26c opens in the gravity direction (downward in the vertical direction of the central axis $O_1$). The vertical portion 26b extends from the horizontal portion 26a along the gravity direction. As a result, the liquid separated from the gas-liquid two-phase fluid flows down by its weight through the vertical portion 26b via the drain opening 26c.

In addition, the vertical portion 26b is connected to a contracted or tapered portion 26d. In the tapered portion 26d, the distribution area for the liquid gradually becomes smaller downward at the intermediate portion. A distal end opening 26e is formed at the distal end (lower end) of the tapered portion 26d. Because of the tapered portion 26d, the opening area of the distal end opening 26e is smaller than that of the drain opening 26c. The vertical portion 26b, the drain opening 26c, the tapered portion 26d, and the distal end opening 26e correspond to a drain pipe.

The third pipe 27 is a straight pipe member that is inserted into a second end of the horizontal portion 26a of the second pipe 26. The third pipe 27 has an outer diameter in which a gap a is generated between the outer circumferential surface of the third pipe 27 and the inner circumferential surface of the horizontal portion 26a when the third pipe 27 is inserted into the second pipe 26. A spacer 28 is fitted in the gap a. The spacer 28 has a cylindrical shape surrounding the entire outer circumferential surface of the third pipe 27 and is in contact with the horizontal portion 26a of the second pipe 26 and the third pipe 27. That is, the second end of the horizontal portion 26a is closed by the spacer 28. The third pipe 27 is inserted into the second pipe 26 until a first end portion 27a is positioned above the drain opening 26c. In addition, the third pipe 27 includes a vent 27b penetrating the circumferential surface of the third pipe 27. The vent 27b is formed at a position where the third pipe 27 protrudes from the second pipe 26. The vent 27b is connected to a second end portion 24b of the bypass pipe 24.

The water storage tank 23 includes a tank body 23a disposed below the vertical portion 26b of the second pipe 26. The tank body 23a includes a first opening 23b formed on an upper surface, a second opening 23c formed on a side surface, and a drain opening (not shown) formed on a bottom surface.

The first opening 23b is connected to the distal end opening 26e of the vertical portion 26b via a communication pipe 23d. The second opening 23c is connected to a first end portion 24a of the bypass pipe 24 The drain opening can be opened and closed as appropriate. The drain opening can be opened when the liquid stored in the tank body 23a reaches a certain amount to discharge the stored liquid to the outside of the tank.

The bypass pipe 24 is a tubular member with both ends open. The bypass pipe 24 includes the first end portion 24a connected to the second opening 23c of the tank body 23a and the second end portion 24b connected to the vent 27b of the third pipe 27. Accordingly, the internal space of the tank body 23a communicates with the inside of the third pipe 27 via the bypass pipe 24.

Figure 3A:
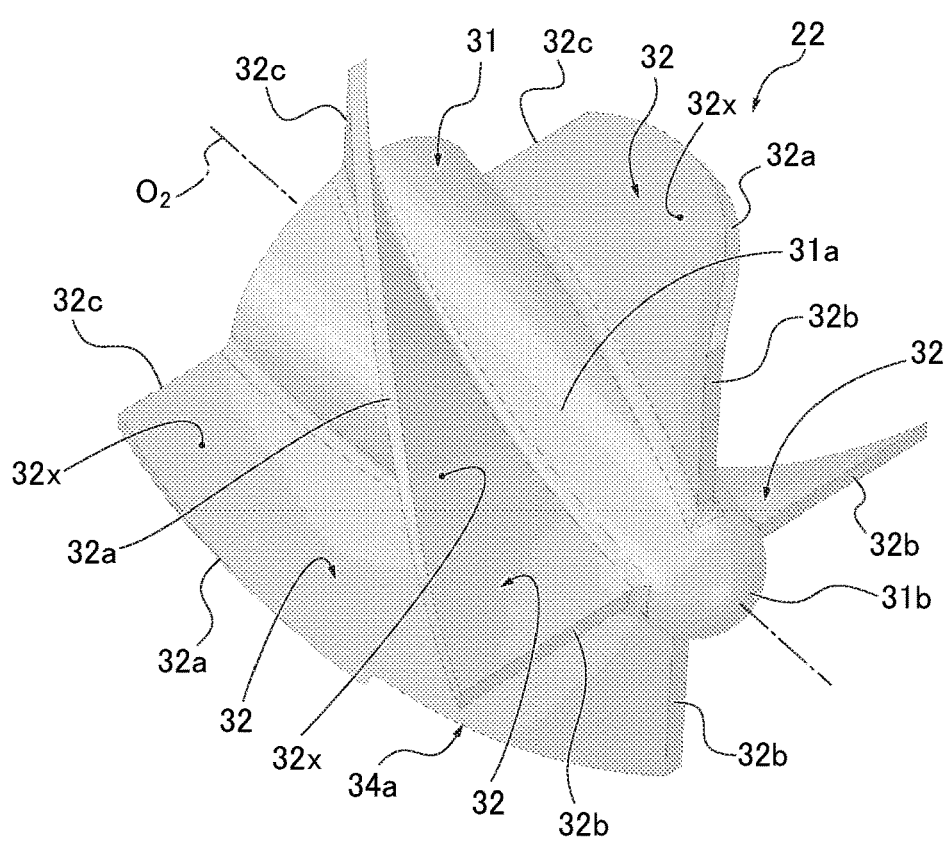
FIG. 3A is a perspective view illustrating a swirling flow generator of the first embodiment.

(Detailed Configuration of Swirling Flow Generator) The swirling flow generator 22 of the first embodiment is disposed in the swirling region 22a of the first pipe 25 to define the flow direction of the gas-liquid two-phase fluid flowing through the pipe member 21 and to swirl the gas-liquid two-phase fluid to be a swirling flow. As illustrated in FIG. 3A, the swirling flow generator 22 includes a blade support portion 31 and a plurality of blades 32 provided on an outer circumferential surface 31a of the blade support portion 31. In this embodiment, four blades 32 are provided.

Figure 3B:
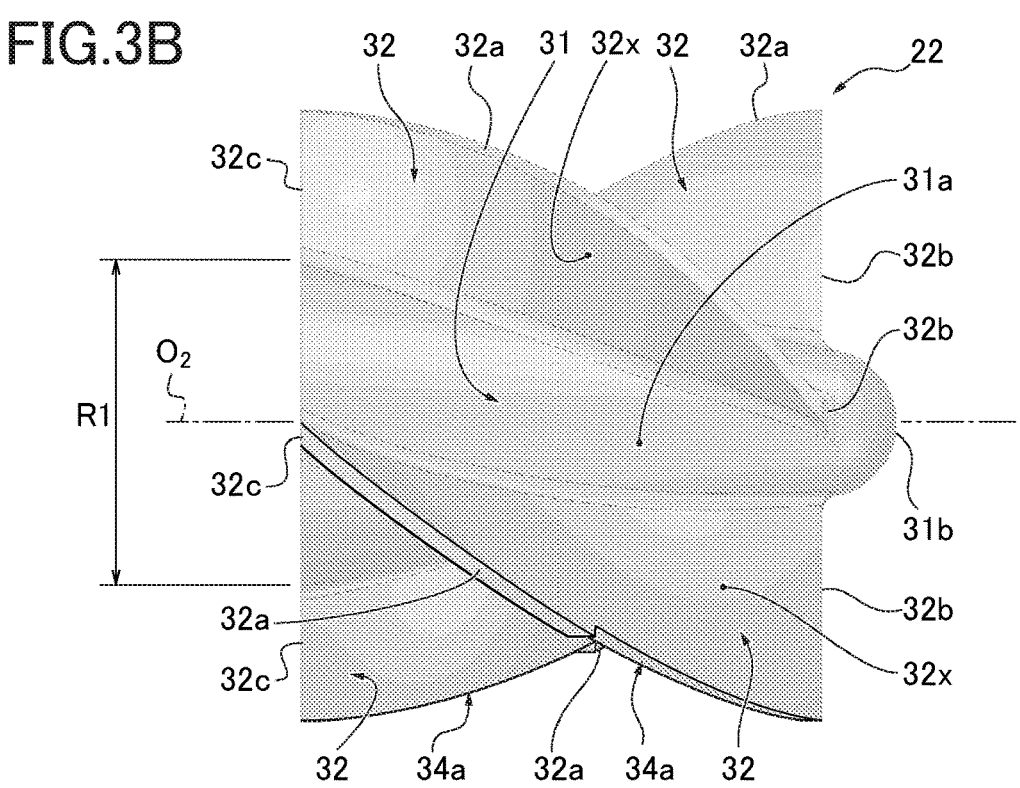
FIG. 3B is a side view illustrating the swirling flow generator of the first embodiment.

As illustrated in FIG. 3A, the blade support portion 31 has a conical shape in which a distal end portion 31b is formed on an R surface. The swirling flow generator 22 is disposed in the swirling region 22a in a direction such that the distal end portion 31b faces the fluid entering side, and the outer diameter dimension of the blade support portion 31 gradually increases toward the fluid exiting side. When the swirling flow generator 22 is disposed in the swirling region 22a, an axial direction $O_2$ of the blade support portion 31 coincides with the central axis $O_1$ of the pipe member 21. A maximum outer diameter dimension R1 of the blade support portion 31 (see FIG. 3B) is set to be smaller than an inner diameter dimension D1 of the swirling region 22a (see FIG. 2).

Each of the blades 32 (four blades in this embodiment) protrudes in the pipe radial direction from the outer circumferential surface 31a of the blade support portion 31 and provided at equal angular intervals around the axial direction $O_2$ of the blade support portion 31 about the axial direction $O_2$ of the blade support portion 31 so that the blades spirally surround the blade support portion 31. When the swirling flow generator 22 is disposed in the swirling region 22a, the axial direction $O_2$ of the blade support portion 31 coincides with the central axis $O_1$ of the pipe member 21. Therefore, in a state where the swirling flow generator 22 is disposed in the swirling region 22a, each of the blades 32 extends to be spirally curved about the central axis $O_1$ of the pipe member 21.

Figure 4:
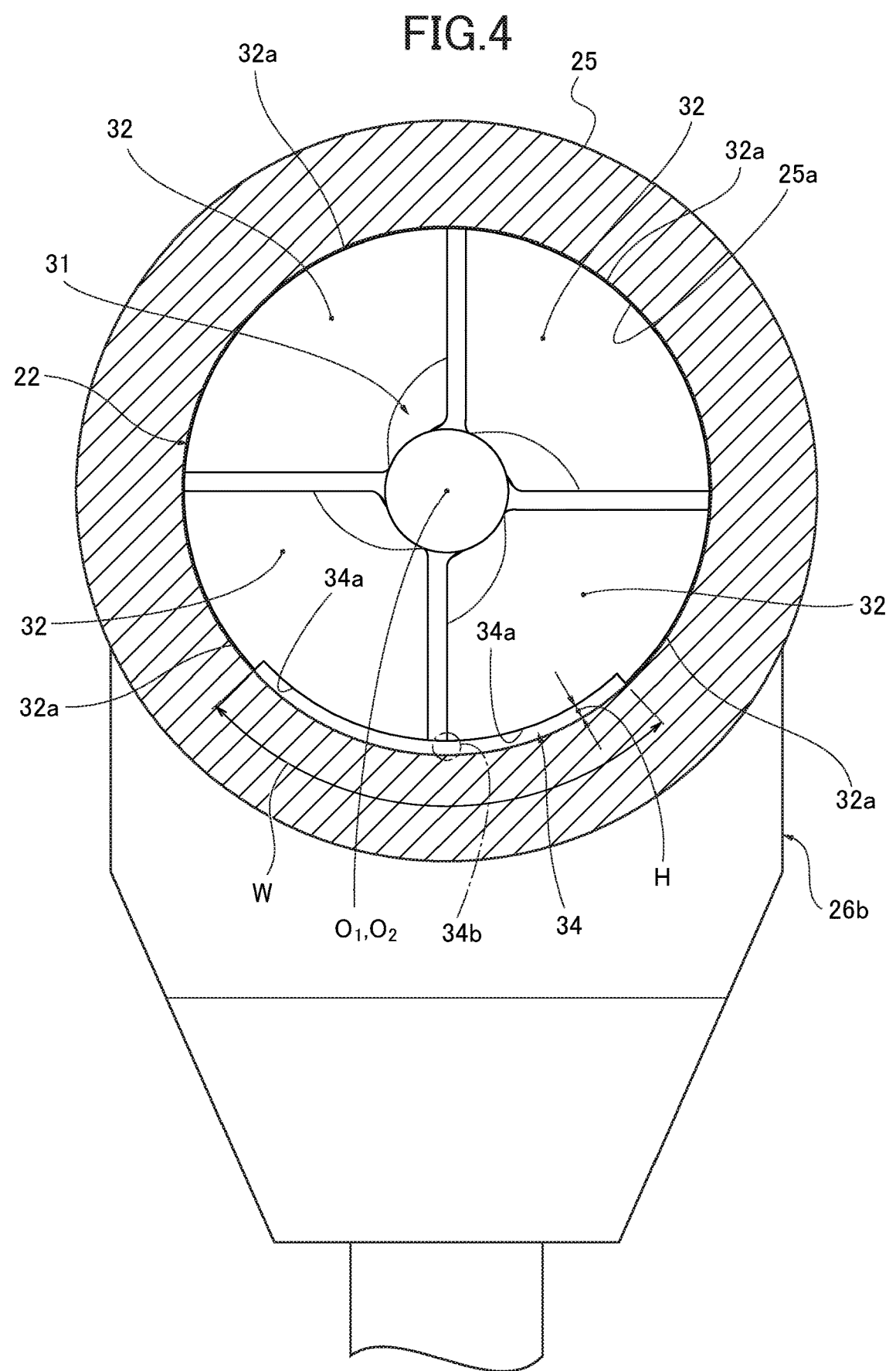
FIG. 4 is a cross-sectional view taken along line A-A illustrated in FIG. 2.

In the first embodiment, the swirling flow generator 22 is disposed in the swirling region 22a such that end portions 32b of the blades 32 on the fluid entering side extend alternately in the vertical direction and the horizontal direction when viewed from the pipe axial direction (see FIG. 4).

Figure 3C:
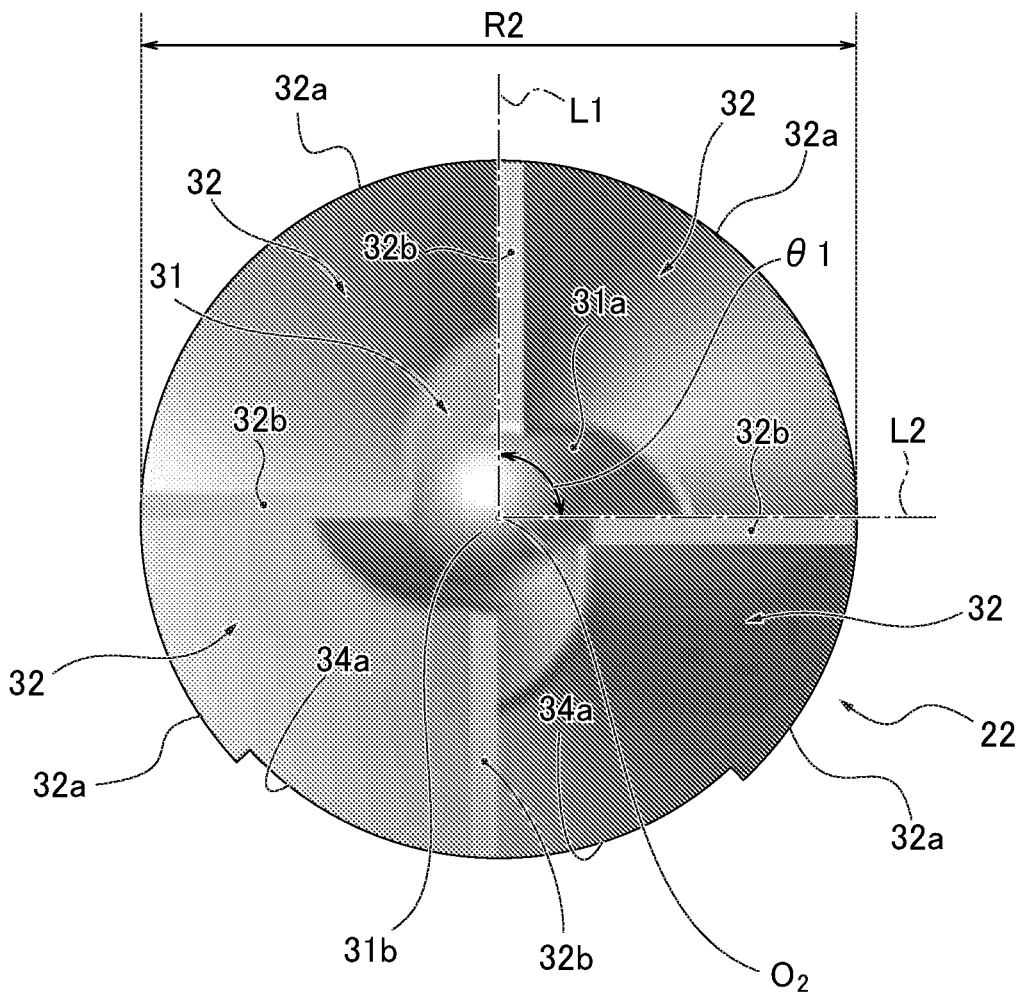
FIG. 3C is a front view illustrating the swirling flow generator of the first embodiment when viewed from a fluid entering side.

In addition, there are the blades 32 which do not include a notch 34a among the plurality of blades 32, which is described later and the blades 32 include a distal end 32a in the pipe radial direction. When the swirling flow generator 22 is disposed in the swirling region 22a, the distal end 32a of each of the blades 32 without notch 34a contacts with the inner circumferential surface 25a of the first pipe 25 (the inner circumferential surface of the pipe member 21) over the entire length of the blade support portion 31 in the axial direction $O_2$. Among the plurality of blades 32, there is a blade 32 which includes the notch 34a at the distal end 32a in the pipe radial direction. In the blade 32 including the notch 34a, a portion other than the notch 34a at the distal end 32a contacts the inner circumferential surface 25a of the first pipe 25 (the inner circumferential surface of the pipe member 21). Thereby, a maximum outer diameter dimension R2 (see FIG. 3C) of the swirling flow generator 22 is set to be equal to the inner diameter dimension D1 of the swirling region 22a. A winding angle θ1 of each of the blades 32 with respect to the blade support portion 31 is set to about 90°. The "winding angle θ1" is an angle formed by a protruding direction L1 of the end portion 32b of the blade 32 on the fluid entering side and a protruding direction L2 of an end portion 32c of the blade 32 on the fluid exiting side when the swirling flow generator 22 is viewed from the pipe axial direction as shown in FIG. 3C. Since the winding angle θ1 is about 90°, the end portion 32c of the blade 32 on the fluid exiting side overlaps the end portion 32b of the adjacent blades 32 on the fluid entering side in the pipe axial direction when the swirling flow generator 22 is viewed from the pipe axial direction. Note that depending on the R shapes generated at the end portions 32b and 32c and the draft angle of the mold, the end portion 32b on the fluid entering side and the end portion 32c on the fluid exiting side of the adjacent blades 32 may not overlap each other in the pipe axial direction.

In the swirling flow generator 22, the winding angles θ1 of the plurality of blades 32 (four blades in this embodiment) are set to about 90°. Accordingly, the distal ends 32a of the blades 32 are continuous over the entire circumferences of the pipe members 21 when viewed from the pipe axial direction, as illustrated in FIG. 4. That is, it is possible to surround the central axis $O_1$ of the pipe member 21 with a trajectory along the distal ends 32a of the blades 32 in the pipe radial direction when the swirling flow generator 22 is viewed from the pipe axial direction. As a result, no gap extending in the pipe axial direction is generated between opposing side surfaces 32x of the adjacent blades 32. In the first embodiment, the notch 34a is formed at the distal end 32a of the blade 32 as described below and the notch 34a is also a part of the distal end 32a.

The gas-liquid separator 16 of the first embodiment includes a communication portion 34 between the inner circumferential surface 25a of the first pipe 25 which is the pipe member 21 and the distal end 32a of the blade 32 of the swirling flow generator 22. The communication portion 34 is a space that extends between the pipe member 21 and the swirling flow generator 22 along the pipe axial direction to communicate a first space X on the upstream side (fluid entering side) of the swirling region 22a where the swirling flow generator 22 is disposed (see FIG. 2) with a second space Y on the downstream side (fluid exiting side) of the swirling region 22a (see FIG. 2). The communication portion 34 is provided by forming the notch 34a in the blade 32 of the swirling flow generator 22. Note that the notch 34a is a portion obtained by cutting out a part of the distal end 32a of the blade 32 in the pipe radial direction.

The communication portion 34 has a predetermined width in the pipe circumferential direction. The direction of the swirling flow generator 22 in the pipe circumferential direction is adjusted when disposed in the swirling region 22a, and the swirling flow generator 22 is disposed such that a central position 34b of the communication portion 34 in the pipe circumferential direction is positioned below the central axis $O_1$ of the pipe member 21 when viewed from the pipe axial direction. In the communication portion 34 of the first embodiment, the central position 34b is located below the central axis $O_1$ in the vertical direction.

In addition, a height H of the communication portion 34 (i.e., a distance from the inner circumferential surface of the pipe member 21 to the blade 32 in the pipe radial direction) is set to about 5% of the radius dimension of the pipe member 21. The height H of the communication portion 34 is set to be constant in the pipe circumferential direction and the pipe axial direction. A width dimension W of the communication portion 34 in the pipe circumferential direction is set to about 25% of the circumferential length of the inner circumferential surface of the pipe member 21 (the inner circumferential surface 25a of the first pipe 25) in the swirling region 22a.

Next, operations of the gas-liquid separator 16 of the first embodiment are described separately with headings "Liquid Collecting at High Flow Rate" and "Liquid Collecting at Low Flow Rate".

(Liquid Collecting at High Flow Rate) In the exhaust gas recirculation system S illustrated in FIG. 1, the outside air taken in from the intake port 2a and the exhaust gas taken in from the exhaust passage 3 via the low-pressure EGR passage 11 flow into the compressor 5a of the turbocharger 5 at a speed of 5 m/s to 110 m/s. The outside air and the exhaust gas contain moisture. When the gas flowing into the compressor 5a is cooled by the EGR cooler 13, if the cooling water temperature is too low or the outside air temperature is low, condensed water is generated and is mixed with the gas to form a gas-liquid two-phase fluid.

When the flow rate of the gas-liquid two-phase fluid is relatively high (for example, 20 m/s to 110 m/s at a high flow rate), the condensed water becomes fine particles and flows in a mixed phase together with the gas.

In the gas-liquid separator 16 of the first embodiment, as illustrated in FIG. 2, the swirling flow generator 22 is disposed inside the first pipe 25 of the pipe member 21. The swirling flow generator 22 includes the plurality of blades 32 protruding in the pipe radial direction from the outer circumferential surface 31a of the blade support portion 31 and extending spirally around the central axis $O_1$ of the pipe member 21.

Figure 5:
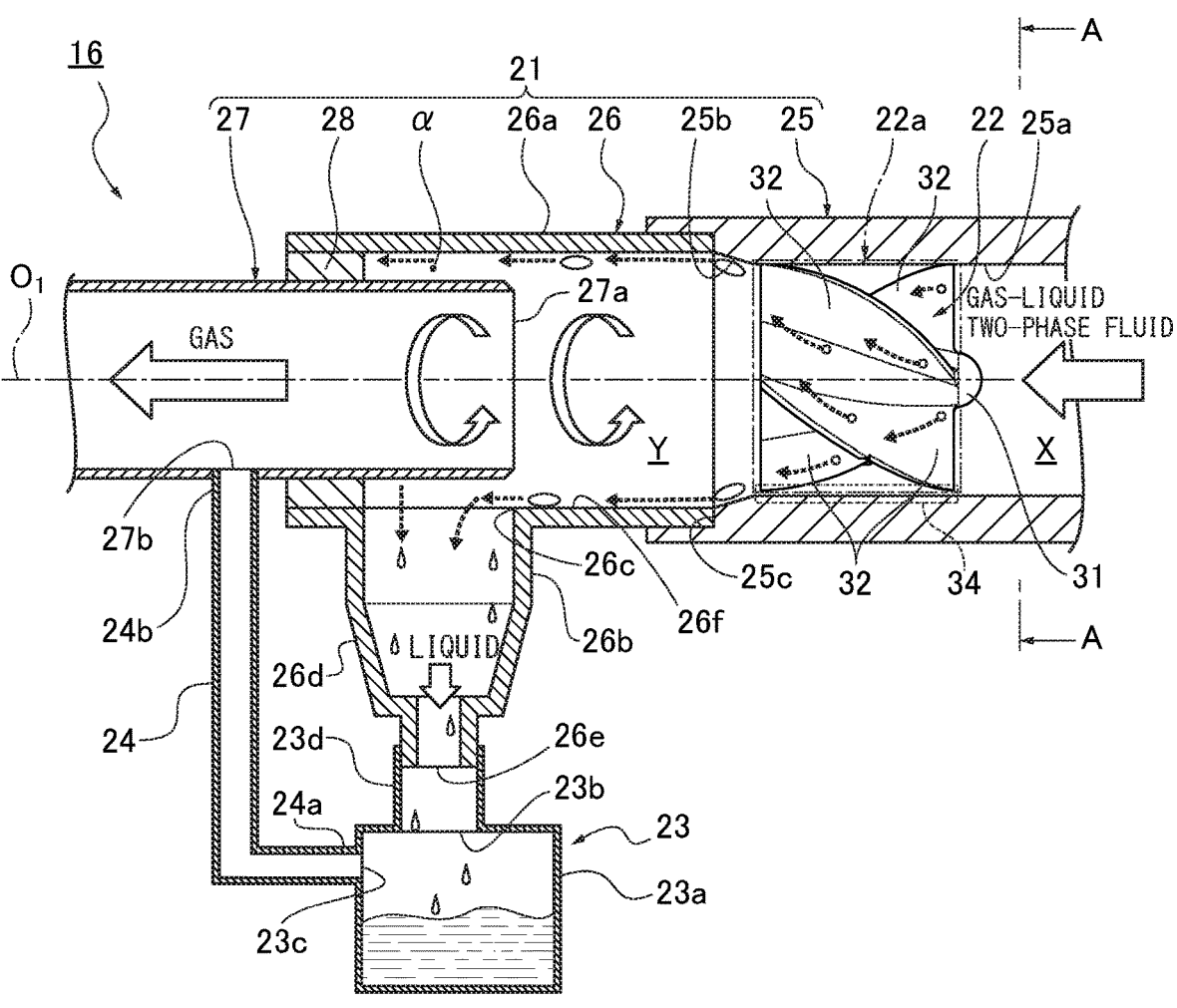
FIG. 5 is an explanatory view illustrating the flow of a gas-liquid two-phase fluid at a high flow rate in the gas-liquid separator of the first embodiment.

Therefore, as illustrated in FIG. 5, the gas-liquid two-phase fluid flowing into the pipe member 21 flows along the blades 32 so that the flow direction of the gas-liquid two-phase fluid is defined and becomes the swirling flow when passing through the swirling region 22a where the swirling flow generator 22 is provided. Then, the liquid having a large mass is guided toward the inner circumferential surface 25a of the first pipe 25 by the centrifugal force generated by the swirling of the gas-liquid two-phase fluid. The liquid guided to the inner circumferential surface 25a of the first pipe 25 adheres to the inner circumferential surface 25a of the first pipe 25 and is condensed into water droplets to be separated from the gas. On the other hand, the air from which the liquid is separated flows linearly in the pipe axial direction while swirling from the first pipe 25 to the second pipe 26, and then flows into the third pipe 27.

On the other hand, as illustrated in FIG. 5, the liquid separated from the gas and formed into water droplets passes through the tapered region 25b from the swirling region 22a and flows to the second pipe 26 while being attached to the inner circumferential surface 25a of the first pipe 25 by the flow of the swirling flow. The liquid flowing into the second pipe 26 flows while being attached to an inner circumferential surface 26f of the second pipe 26, flows into the drain opening 26c and flows down the vertical portion 26b. Thereafter, the liquid is discharged through the distal end opening 26e and stored in the tank body 23a.

As described above, in the gas-liquid separator 16 of the first embodiment, when the gas-liquid two-phase fluid flows at a high flow rate, the gas-liquid two-phase fluid is swirled by the swirling flow generator 22, and the gas and the liquid can be separated by centrifugal force. The gas-liquid separator 16 of the first embodiment guides the liquid toward the inner circumferential surface 25a of the first pipe 25 and attaches the liquid to the inner circumferential surface 25a, so that the liquid can be collected in the water storage tank 23 while suppressing re-scattering of the liquid.

Figure 6:
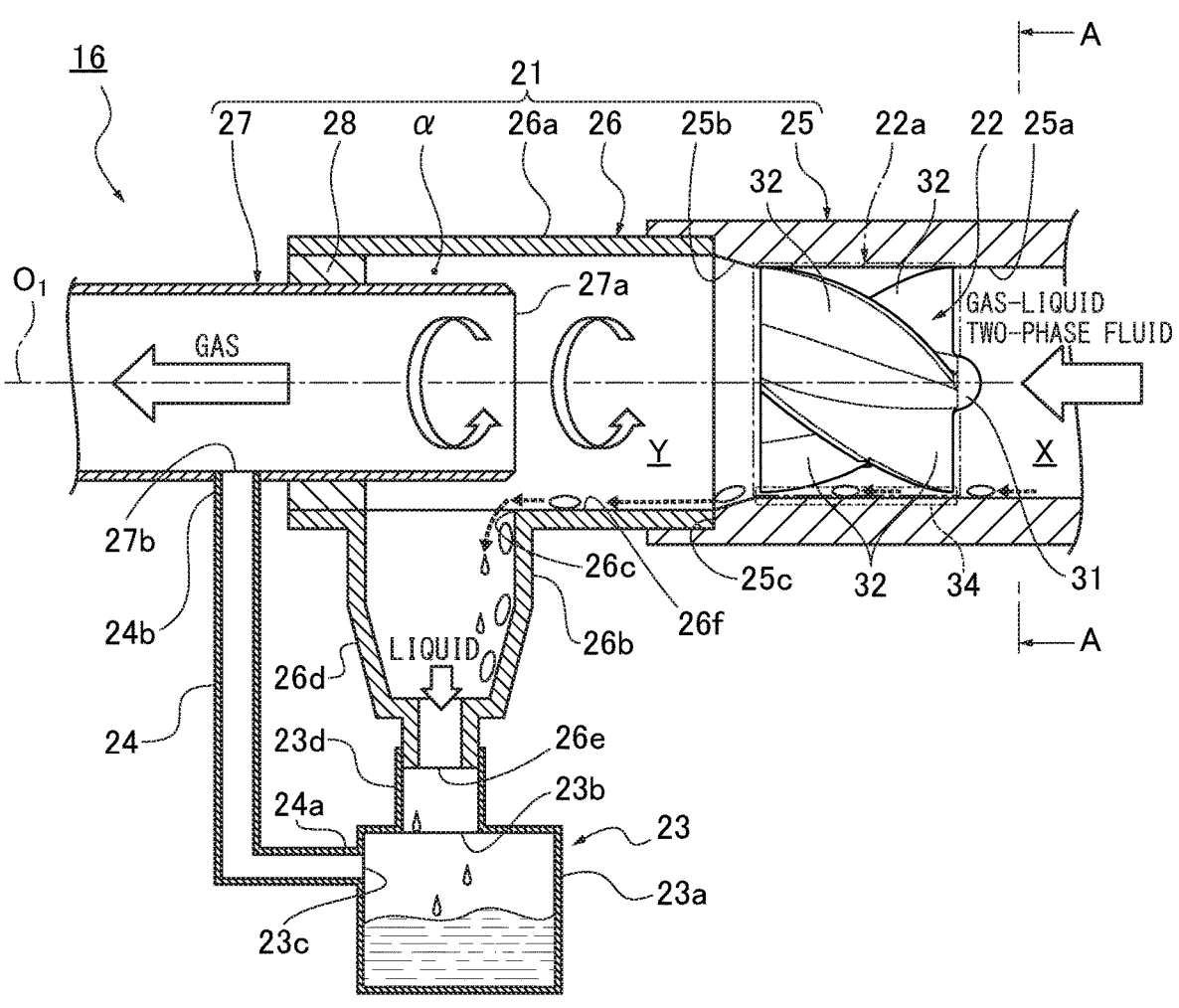
FIG. 6 is an explanatory view illustrating the flow of the gas-liquid two-phase fluid at a low flow rate in the gas-liquid separator of the first embodiment.

(Liquid Collecting at Low Flow Rate) In the exhaust gas recirculation system S of the first embodiment, when the flow rate of the gas-liquid two-phase fluid is relatively slow (at a low flow rate, for example, 5 m/s to 20 m/s), the condensed water is less likely to be fine particles. In this case, as illustrated in FIG. 6, before the gas-liquid two-phase fluid flows into the swirling region 22a where the swirling flow generator 22 is disposed, that is, before swirling, the gas and the liquid are naturally separated from each other, and the liquid that has become the water droplets adheres to the inner circumferential surface 25a of the first pipe 25. The gas flows from the first pipe 25 to the second pipe 26 and flows into the third pipe 27. When passing through the swirling region 22a, the gas flows along the blade 32 to be the swirling flow and flows linearly along the pipe axial direction while swirling.

On the other hand, the liquid adhering to the inner circumferential surface 25a of the first pipe 25 cannot flow in a mixed phase together with the gas. The liquid flows toward the swirling region 22a while adhering to the inner circumferential surface 25a of the first pipe 25 by the flow of the gas.

In the first embodiment, the swirling flow generator 22 includes the blades 32 surrounding the blade support portion 31. The distal ends 32a of the blades 32 in the pipe radial direction are in contact with the inner circumferential surface 25a of the first pipe 25, and the winding angle θ1 of each of the blades 32 with respect to the blade support portion 31 is set to about 90°. In addition, the distal ends 32*a* of the blades 32 are continuous over the entire circumference of the pipe member 21 when viewed from the pipe axial direction. The communication portion 34 is provided between the inner circumferential surface 25*a* of the first pipe 25 and the blade 32 of the swirling flow generator 22. The communication portion 34 extends along the pipe axial direction between the first pipe 25 and the swirling flow generator 22 and communicates the first space X upstream of the swirling region 22*a* with the second space Y downstream of the swirling region 22*a*.

Therefore, the liquid (water droplet) separated from the gas before flowing into the swirling region 22*a* flows through the communication portion 34 horizontally to the central axis $O_1$ inside the pipe member 21 so that the liquid (water droplet) flows into the second space Y from the first space X. That is, the liquid adhering to the inner circumferential surface 25*a* of the first pipe 25 can smoothly pass through the swirling region 22*a* without being obstructed by the swirling flow generator 22.

The liquid that has passed through the swirling region 22*a* passes through the tapered region 25*b* while adhering to the inner circumferential surface 25*a* of the first pipe 25, and flows into the second pipe 26. The liquid flowing into the second pipe 26 flows while being attached to an inner circumferential surface 26*f* of the second pipe 26 and flows into the drain opening 26*c* to flow down the vertical portion 26*b*. Then, the liquid is discharged through the distal end opening 26*e* and stored in the tank body 23*a*.

As described above, in the gas-liquid separator 16 of the first embodiment, even when the flow rate of the gas-liquid two-phase fluid is relatively low, and the gas and the liquid are naturally separated before passing through the swirling region 22*a*, the liquid can flow through the communication portion 34 provided between the inner circumferential surface 25*a* of the first pipe 25 and the blade 32. Therefore, even if the distal ends 32*a* of the blades 32 are continuous over the entire circumference of the pipe member 21 when viewed from the pipe axial direction, the flow of the liquid is not obstructed by the blades 32, and the liquid can be collected on the fluid exiting side of the swirling flow generator 22. As a result, regardless of the flow rate of the gas-liquid two-phase fluid, the liquid can be collected at the position downstream of the swirling flow generator 22.

In addition, the communication portion 34 is a space formed in a portion in the pipe circumferential direction between the inner circumferential surface 25*a* of the first pipe 25 and the blade 32. The distal ends 32*a* of the blades 32 contact the inner circumferential surface 25*a* of the first pipe 25, except for the distal end 32*a* facing the communication portion 34. Therefore, the swirling flow generator 22 can be supported by the pipe member 21, and strength against vibration of the swirling flow generator 22 can be secured.

In the gas-liquid separator 16 of the first embodiment, communication portion 34 consists of the notch 34*a* formed in the blade 32. Therefore, it is not necessary to form irregularities on the inner circumferential surface 25*a* of the first pipe 25, and thus the first pipe 25 can be easily formed.

Also, the position of the communication portion 34 in the pipe circumferential direction can be defined by the direction in the pipe circumferential direction when the swirling flow generator 22 is disposed in the swirling region 22*a*. Therefore, the position of the communication portion 34 in the pipe circumferential direction can be easily and finely adjusted.

In the gas-liquid separator 16 of the first embodiment, the central position 34*b* of the communication portion 34 in the pipe circumferential direction is positioned below the central axis $O_1$ of the pipe member 21 in the gravity direction when viewed from the pipe axial direction. As a result, the liquid flowing down to the lower portion of the pipe member 21 (the first pipe 25) by its weight can flow into the communication portion 34, so that the liquid can be smoothly collected.

Particularly, in the first embodiment, the central position 34*b* of the communication portion 34 in the pipe circumferential direction is positioned below the central axis $O_1$ of the pipe member 21 in the vertical direction. This ensures that the liquid flowing down to the lower portion of the pipe member 21 by gravity can reliably flow into the communication portion 34.

Moreover, in the gas-liquid separator 16 of the first embodiment, the gap a is generated between the second pipe 26 and the third pipe 27. Therefore, the liquid adhering to the inner circumferential surface 26*f* of the second pipe 26 enters the gap a, which prevents the liquid adhering to the inner circumferential surface 26*f* from flowing into the third pipe 27. In addition, the third pipe 27 on the fluid exiting side is inserted into the second pipe 26. Accordingly, an increase in the outer diameter dimension of the pipe member 21 can be suppressed, and a space required for installing the gas-liquid separator 16 can be suppressed.

In the first embodiment, the spacer 28 is attached to the second end of the horizontal portion 26*a* of the second pipe 26 to close the gap a, thereby, preventing the gas from leaking out between the second pipe 26 and the third pipe 27 and allowing the gas to flow smoothly into the third pipe 27.

In addition, in the first embodiment, the third pipe 27 and the water storage tank 23 communicate with each other via the bypass pipe 24. Therefore, the airflow through the third pipe 27 creates a negative pressure inside the water storage tank 23 and thus the flow of the liquid flowing down the vertical portion 26*b* can be smoothed. In the embodiment illustrated in FIG. 2, the bypass pipe 24 is connected to the second opening 23*c* formed on the side surface of the tank body 23*a*. However, the present disclosure is not limited thereto, and for example, the bypass pipe 24 may be connected to an opening formed on the upper surface of the tank body 23*a*.

Although the gas-liquid separator of the present disclosure has been described based on the first embodiment, the specific configuration of the gas-liquid separator is not limited to the first embodiment. Any modifications, additions, and the like of the design of the gas-liquid separator are allowed without departing from the gist of the invention according to each of the claims.

In the gas-liquid separator 16 of the first embodiment, the central position 34*b* of the communication portion 34 in the pipe circumferential direction is positioned vertically below the central axis $O_1$ of the pipe member 21. However, the position of the communication portion 34 is not limited thereto. For example, as illustrated in FIG. 7, the central position 34*b* of the communication portion 34 in the pipe circumferential direction may be set at a position shifted by a predetermined angle in the direction in which the gas-liquid two-phase fluid is swirled by the swirling flow generator 22 (clockwise direction in FIG. 7) with respect to position vertically below the central axis $O_1$.

As a result, even if a part of the liquid adhering to the inner circumferential surface 25*a* of the first pipe 25 flows in the pipe circumferential direction by the swirling flow, the liquid can flow into the communication portion 34. Therefore, in the gas-liquid separator 16 of the first embodiment, the flow of the liquid is not obstructed by the swirling flow generator 22, and the liquid can be appropriately collected downstream of the swirling flow generator 22.

Figure 7:
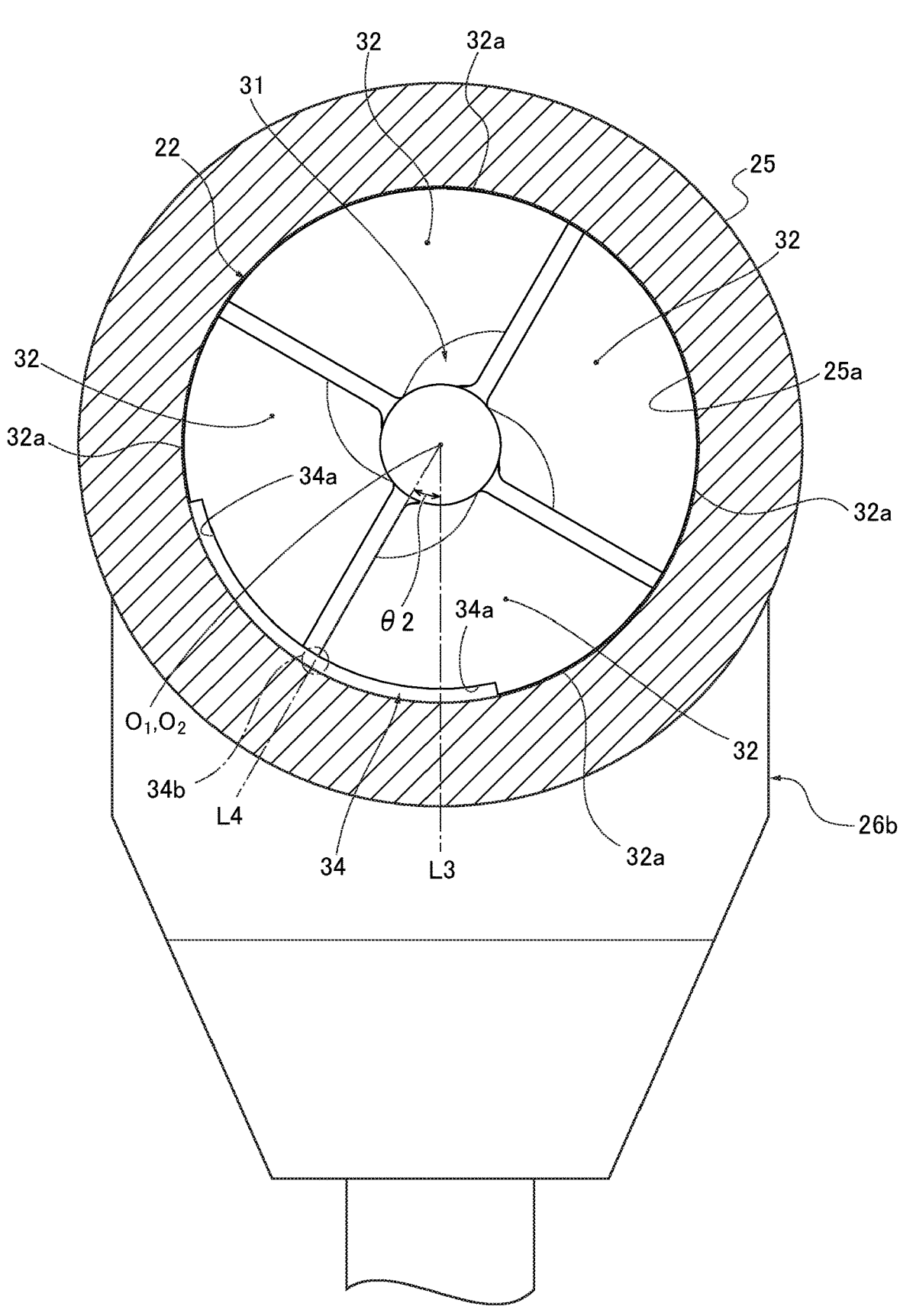
FIG. 7 is a cross-sectional view illustrating a main part of a first modification of the gas-liquid separator of the first embodiment.

Note that the swirling direction by the swirling flow generator 22 is not limited to the clockwise direction illustrated in FIG. 7 and may be the opposite direction. In addition, an angle at which the central position 34$b$ of the communication portion 34 in the pipe circumferential direction is shifted with respect to the vertical direction, that is, an angle θ2 formed by a vertical direction line L3 passing through the central axis O$_1$ and a straight line L4 passing through the central axis O$_1$ and the central position 34$b$ of the communication portion 34 in the pipe circumferential direction can be set within a range of about 90° or less as desired.

Figure 8:
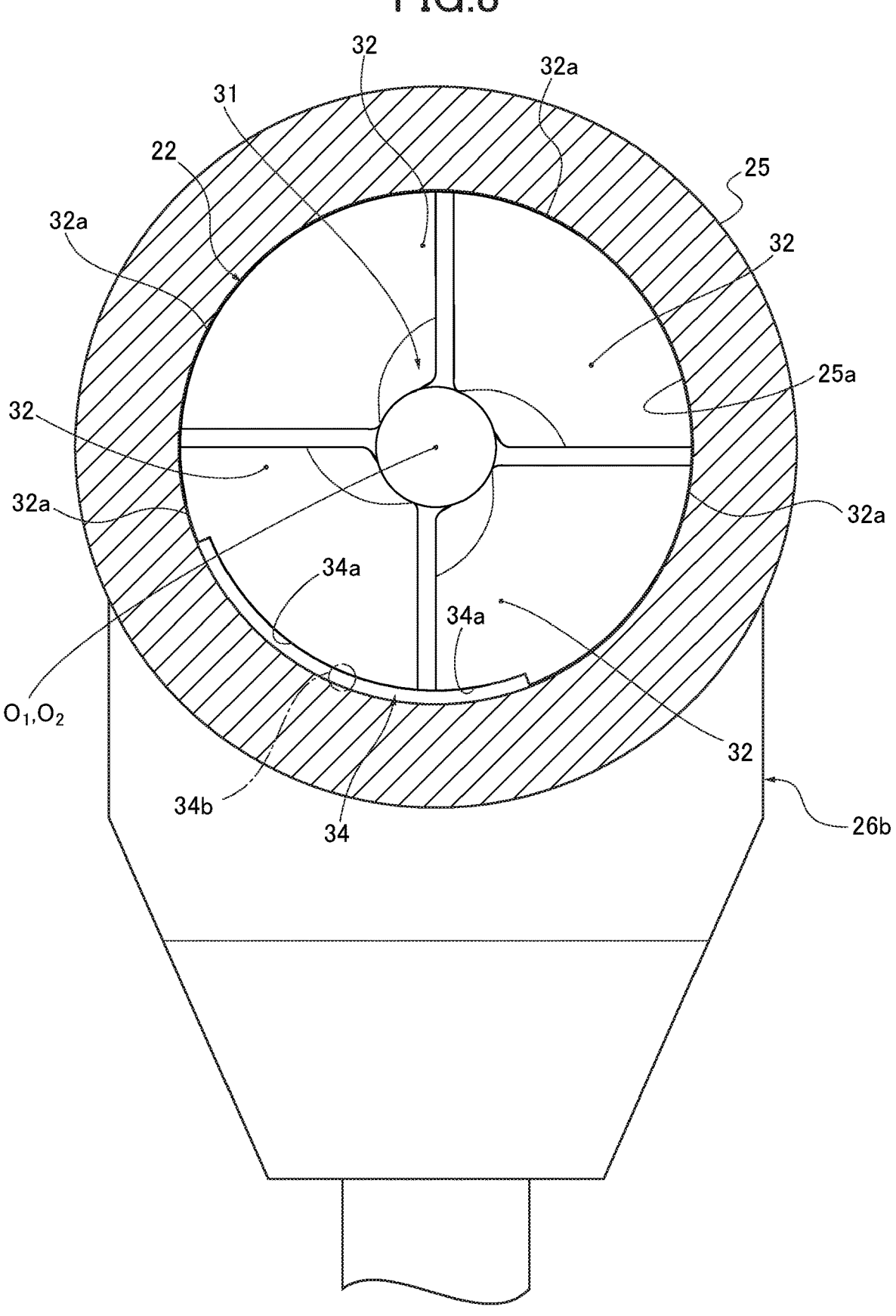
FIG. 8 is a cross-sectional view illustrating a main part of a second modification of the gas-liquid separator of the first embodiment.

The relationship between the position of the communication portion 34 and the protruding direction L1 of the end portion 32$b$ of each blade 32 on the fluid entering side when viewed from the pipe axial direction can be set as desired. That is, as illustrated in FIG. 7, when the central position 34$b$ of the communication portion 34 in the pipe circumferential direction is set to a position shifted by a predetermined angle with respect to the position below the central axis O$_1$ in the vertical direction, the end portion 32$b$ of one of the blades 32 on the fluid entering side may be set to extend along the straight line L4 passing through the central axis O$_1$ and the central position 34$b$ of the communication portion 34 in the pipe circumferential direction when viewed from the pipe axial direction. In addition, as illustrated in FIG. 8, the central position 34$b$ of the communication portion 34 in the pipe circumferential direction may be set to a position shifted by a predetermined angle with respect to the position below the central axis O$_1$ in the vertical direction, and the end portions 32$b$ of the plurality of blades 32 on the fluid entering side may be set to alternately extend in the horizontal direction and the vertical direction when viewed from the pipe axial direction. In addition, although not illustrated, the central position 34$b$ of the communication portion 34 in the pipe circumferential direction may be set at a position below the central axis O$_1$ in the vertical direction, and the end portions 32$b$ of the plurality of blades 32 on the fluid entering side may be set to extend along directions shifted from the horizontal direction and the vertical direction.

Figure 9:
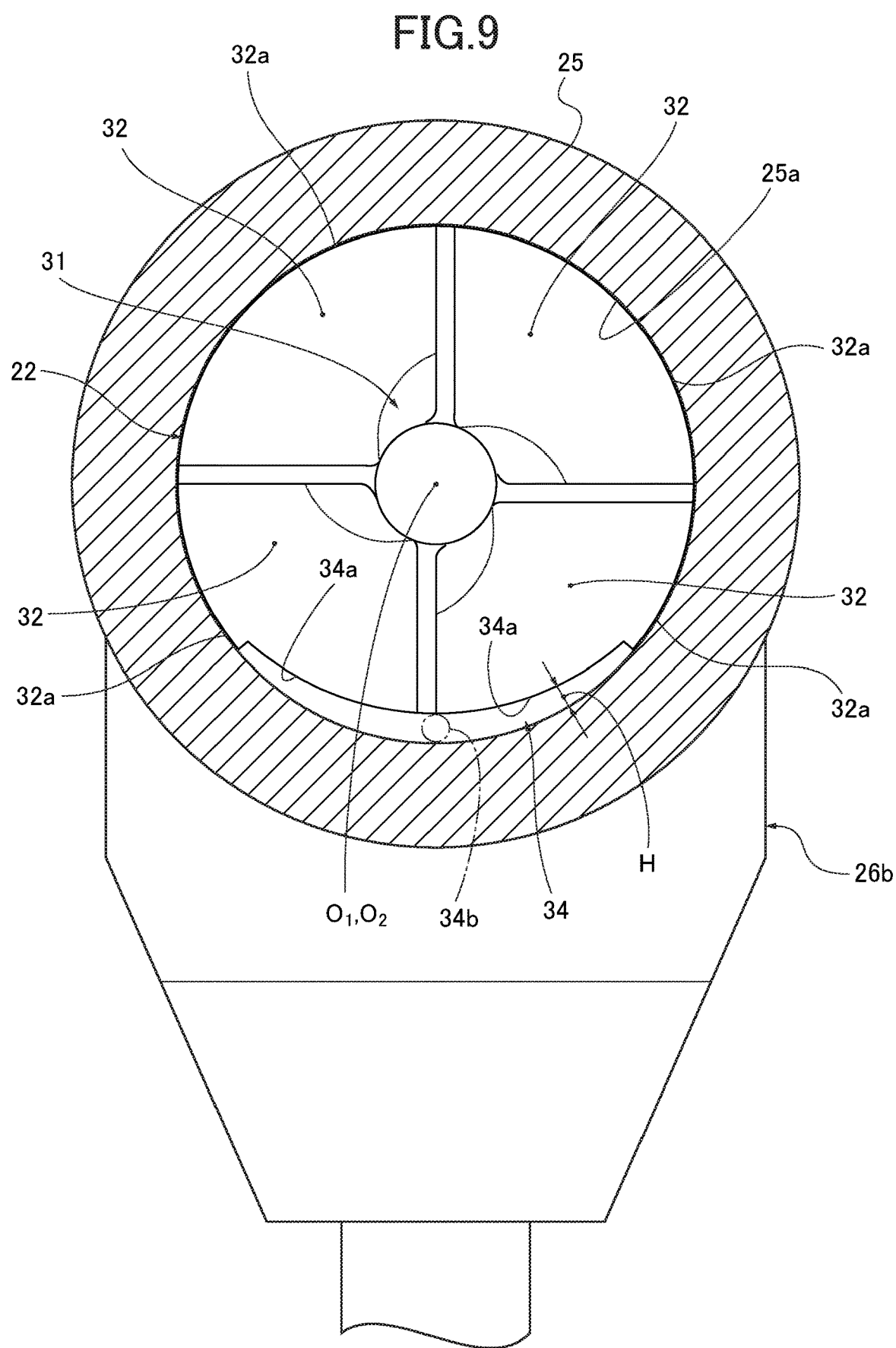
FIG. 9 is a cross-sectional view illustrating a main part of a third modification of the gas-liquid separator of the first embodiment.

In the gas-liquid separator 16 of the first embodiment, the height H of the communication portion 34 is set to be constant in the pipe axial direction and the pipe circumferential direction. However, the height H of the communication portion 34 is not limited thereto. For example, as illustrated in FIG. 9, the height H of a part of the communication portion 34 in the pipe circumferential direction (the central position 34$b$ of the communication portion 34 in the pipe circumferential direction in the example illustrated in FIG. 9) may be set higher than the other part (both end portions in the pipe circumferential direction in the example illustrated in FIG. 9). Thereby, the gas-liquid separator 16 can promptly flow the liquid collected at the central position 34$b$ of the communication portion 34 in the pipe circumferential direction. Note that the height H of the communication portion 34 gradually changes along the pipe circumferential direction in FIG. 9. However, the height H of the communication portion 34 is not limited thereto and may change stepwise along the pipe circumferential direction.

In the gas-liquid separator 16 of the first embodiment, the swirling flow generator 22 includes the conical blade support portion 31 and the plurality of blades 32 protruding from the outer circumferential surface 31$a$ of the blade support portion 31. However, the shape of the swirling flow generator 22 is not limited to that of the first embodiment. For example, the swirling flow generator may be formed from a spirally twisted plate member. That is, the present disclosure can be applied to any gas-liquid separator including a swirling flow generator including one or more blades that extend spirally about the central axis O$_1$ of the pipe member 21 and whose distal end in the pipe radial direction is continuous over the entire circumference of the pipe member 21 when viewed from the pipe axial direction.

In addition, in the first embodiment, the swirling flow generator 22 includes four blades 32 each of which is set to have the winding angle θ1 of about 90°. However, the number of the blades 32 is not limited to four and the angle of the winding angle θ1 is not limited to about 90°. The number of the blades 32 and the angle of the winding angle θ1 may be set as desired as long as the distal ends 32$a$ of the blades 32 are continuous over the entire circumference of the pipe member 21 in the swirling flow generator 22 when viewed from the pipe axial direction.

In addition, the communication portion 34 of the first embodiment is provided by forming the notch 34$a$ in the blade 32. However, the configuration of the communication portion 34 is not limited thereto. For example, the communication portion 34 may be formed by providing the notch 34$a$ formed at the distal end 32$a$ of the blade 32 and a groove formed in the inner circumferential surface 25$a$ of the first pipe 25 of the pipe member 21 and extending in the pipe axial direction and arranging the notch 34$a$ and the groove to face each other. That is, the communication portion 34 may be formed only in the swirling flow generator 22 or may be formed in both the pipe member 21 and the swirling flow generator 22.

In the first embodiment, the water storage tank 23 is connected to the distal end opening 26$e$ of the vertical portion 26$b$. However, the vertical portion 26$b$ and the water storage tank 23 may not necessarily be installed. The liquid discharged from the drain opening 26$c$ may be directly discharged to the outside of the pipe member 21 without being stored. Further, the bypass pipe 24 is not necessarily provided.

In the first embodiment, even in the exhaust gas recirculation system S, the gas-liquid separator 16 is installed at the position downstream of the low-pressure EGR valve 14 and the position upstream of the compressor 5$a$ of the turbocharger 5 (the position surrounded in the alternate long and short dash line X in FIG. 1). However, the present disclosure is not limited to the above example. The gas-liquid separator 16 is installed at a position where condensed water is generated in the exhaust gas recirculation system S. Accordingly, the gas-liquid separator may be installed at a position downstream of the intercooler 6 and upstream of the cylinder air supply port of the internal combustion engine 1 (a position surrounded by an alternate long and short dash line Y in FIG. 1).

In addition, in the first embodiment, the internal combustion engine 1 is a diesel engine mounted on a vehicle. However, the present disclosure is not limited thereto, and the internal combustion engine 1 may be a gasoline engine.

In the first embodiment, the gas-liquid separator 16 is applied to the exhaust gas recirculation system S of the internal combustion engine 1. However, the application of the gas-liquid separator 16 is not limited to the above example. For example, the gas-liquid separator 16 may be applied to a refrigeration cycle device to separate the gas refrigerant and the liquid refrigerant. That is, the gas-liquid separator of the present disclosure may be applied to a device that separates gas and liquid from a gas-liquid two-phase fluid.

In addition, the shape of the pipe member 21, the connection point of the first pipe 25 and the like, the diameter dimensions of the pipes, the material to be used, and the like are not limited to those illustrated in the first embodiment and may be set as desired.

The invention claimed is:

1. A gas-liquid separator comprising:

a pipe member through which a gas-liquid two-phase fluid flows, the gas-liquid two-phase fluid comprising gas and liquid; and a swirling flow generator disposed inside a first pipe of the pipe member, the swirling flow generator being configured to swirl the gas-liquid two-phase fluid to separate the gas and the liquid therefrom, wherein the swirling flow generator comprises a blade support portion and a plurality of blades provided on an outer circumferential surface of the blade support portion, the blades extending spirally about a central axis of the pipe member, wherein each of the blades comprises a distal end in a pipe radial direction of the pipe member, and wherein a communication portion is provided between the pipe member and the swirling flow generator, the communication portion being configured to communicate a first space upstream of the swirling flow generator with a second space downstream of the swirling flow generator;

wherein the communication portion is provided by forming a notch in the blade of the swirling flow generator and the notch is a portion obtained by cutting out a part of the distal end of the blade in the pipe radial direction, wherein when the swirling flow generator is disposed in a swirling region, the distal end of each of the blades without the notch contacts with the inner circumferential surface of the first pipe over an entire length of the blade support portion in an axial direction, wherein among the plurality of blades, there is a blade that comprises the notch at the distal end in the pipe radial direction, and in the blade comprising the notch, a portion other than the notch at the distal end contacts the inner circumferential surface of the first pipe, wherein a central position of the communication portion in a pipe circumferential direction is positioned below the central axis in a gravity direction, and wherein the central position of the communication portion in the pipe circumferential direction is shifted from a position below the central axis in a vertical direction, in a swirl direction of the gas-liquid two-phase fluid which is swirled by the swirling flow generator; wherein the notch is formed over a predetermined length from an end portion of the blade on a fluid entering side toward an end portion of the blade on a fluid exiting side; wherein the plurality of blades extend radially outward from the blade support portion, and wherein the plurality of blades are independently arranged with circumferential spacing about the blade support portion.

2. The gas-liquid separator according to claim 1, wherein height of the communication portion is set to be constant in a pipe circumferential direction and a pipe axial direction.

* * * * *